US008384516B2

(12) United States Patent
Fein et al.

(10) Patent No.: US 8,384,516 B2
(45) Date of Patent: Feb. 26, 2013

(54) SYSTEM AND METHOD FOR RADIO FREQUENCY IDENTIFIER VOICE SIGNATURE

(75) Inventors: Gene S. Fein, Lenox, MA (US); Edward Merritt, Lenox, MA (US)

(73) Assignee: Voorhuis PLC, Limited Liability Company, Wilmington, DE (US)

( * ) Notice: Subject to any disclaimer, the term of this patent is extended or adjusted under 35 U.S.C. 154(b) by 1063 days.

(21) Appl. No.: 11/622,630

(22) Filed: Jan. 12, 2007

(65) Prior Publication Data

US 2008/0169903 A1    Jul. 17, 2008

(51) Int. Cl.
*G06F 7/00* (2006.01)
(52) U.S. Cl. ...... 340/5.84; 340/5.8; 340/5.81; 340/5.82; 340/5.52; 340/5.51
(58) Field of Classification Search ............ 705/14; 726/5; 340/5.51–5.55, 5.8–5.85
See application file for complete search history.

(56) References Cited

U.S. PATENT DOCUMENTS

| | | | |
|---|---|---|---|
| 4,138,058 A | | 2/1979 | Atalla |
| 4,682,368 A | * | 7/1987 | Takahashi .................. 340/7.21 |
| 4,879,747 A | * | 11/1989 | Leighton et al. ............ 713/186 |
| 4,885,778 A | * | 12/1989 | Weiss ........................ 713/184 |
| 6,084,967 A | * | 7/2000 | Kennedy et al. ............ 380/247 |
| 6,263,064 B1 | * | 7/2001 | O'Neal et al. ........... 379/201.03 |
| 6,428,449 B1 | * | 8/2002 | Apseloff ......................... 482/3 |
| 6,629,077 B1 | * | 9/2003 | Arling et al. ................. 704/275 |
| 6,664,897 B2 | | 12/2003 | Pape et al. |
| 6,765,470 B2 | * | 7/2004 | Shinzaki .................... 340/5.52 |
| 6,979,264 B2 | * | 12/2005 | Chatigny et al. ............... 463/29 |
| 7,097,098 B2 | | 8/2006 | Roberts |
| 7,158,776 B1 | * | 1/2007 | Estes et al. .................. 455/411 |
| 7,165,722 B2 | | 1/2007 | Shafer et al. |
| 7,227,566 B2 | * | 6/2007 | Abe et al. .................. 348/14.05 |
| 7,290,287 B2 | | 10/2007 | Rodriguez et al. |
| 7,536,304 B2 | * | 5/2009 | Di Mambro et al. ......... 704/273 |
| 7,570,167 B2 | | 8/2009 | Fein et al. |

(Continued)

FOREIGN PATENT DOCUMENTS

| | | |
|---|---|---|
| WO | 2006031255 | 3/2006 |
| WO | 2008089107 | 7/2008 |

OTHER PUBLICATIONS

European Patent Office; International Search Report for PCT/US2008/050934; Jun. 3, 2008; 4 pgs.

(Continued)

*Primary Examiner* — Jennifer Mehmood
*Assistant Examiner* — Ryan Sherwin
(74) *Attorney, Agent, or Firm* — Stolowitz Ford Cowger LLP

(57) ABSTRACT

Conventional techniques for logging and using a user's signature are insecure and inflexible. A system and method are provided which: i) translate a user's first signature, such as a user's voice signature, into a user's second signature, such as a radio frequency identifier signature; and ii) deploy the user's second signature. By translating the user's first signature into the user's second signature and deploying the user's second signature, the provided technique assures the authenticity of the user. Furthermore, the provided system and method enable additional authentication factors, such as a user's personal identification number, to be used with the user's first and second signatures in multiple combinations and sequences to assure the authenticity of the user. As such, the invention provides a security layer offering added security and added flexibility previously unavailable, and which may be applied in a variety of contexts, such as a user device or a retail transaction.

25 Claims, 12 Drawing Sheets

U.S. PATENT DOCUMENTS

| | | | |
|---|---|---|---|
| 7,668,754 B1 | 2/2010 | Bridgelall | |
| 7,769,221 B1 | 8/2010 | Shakes et al. | |
| 7,805,614 B2* | 9/2010 | Aull et al. | 713/186 |
| 2001/0052013 A1* | 12/2001 | Munguia et al. | 709/225 |
| 2002/0069166 A1 | 6/2002 | Moreau et al. | |
| 2002/0077937 A1 | 6/2002 | Lyons et al. | |
| 2003/0095032 A1 | 5/2003 | Hoshino et al. | |
| 2003/0120416 A1* | 6/2003 | Beggs et al. | 701/100 |
| 2003/0149662 A1 | 8/2003 | Shore | |
| 2003/0163423 A1 | 8/2003 | Holst-Roness | |
| 2004/0101112 A1* | 5/2004 | Kuo | 379/88.01 |
| 2004/0162739 A1* | 8/2004 | Lax | 705/1 |
| 2004/0199424 A1* | 10/2004 | Scott et al. | 705/14 |
| 2005/0149391 A1* | 7/2005 | O'Shea et al. | 705/14 |
| 2005/0218215 A1 | 10/2005 | Lauden | |
| 2005/0239511 A1* | 10/2005 | Boillot et al. | 455/563 |
| 2005/0276728 A1 | 12/2005 | Muller-Cohn et al. | |
| 2006/0046842 A1 | 3/2006 | Mattice | |
| 2006/0102717 A1* | 5/2006 | Wood et al. | 235/382 |
| 2006/0208070 A1* | 9/2006 | Kato et al. | 235/383 |
| 2006/0258397 A1 | 11/2006 | Kaplan | |
| 2007/0009139 A1* | 1/2007 | Landschaft et al. | 382/115 |
| 2008/0118042 A1* | 5/2008 | Hogg | 379/93.03 |
| 2008/0129507 A1* | 6/2008 | Doan et al. | 340/572.1 |
| 2008/0191878 A1 | 8/2008 | Abraham | |
| 2008/0238613 A1* | 10/2008 | Salva Calcagno | 340/5.83 |
| 2009/0219135 A1* | 9/2009 | Harvey et al. | 340/5.82 |
| 2009/0276326 A1 | 11/2009 | Fein et al. | |
| 2010/0199334 A1* | 8/2010 | Ehrensvard et al. | 726/5 |

OTHER PUBLICATIONS

Stolowitz Ford Cowger LLP; Listing of Related Cases, Aug. 31, 2011; 1 page.

Stolowitz Ford Cowger LLP, "Listing of Related Cases", Oct. 22, 2012, 1 page.

Haedong Lee et al., "A Study on RFID Privacy Mechanism Using Mobile Phone", World Academy of Science, Engineering and Technology, Oct. 2005, p. 75-78.

* cited by examiner

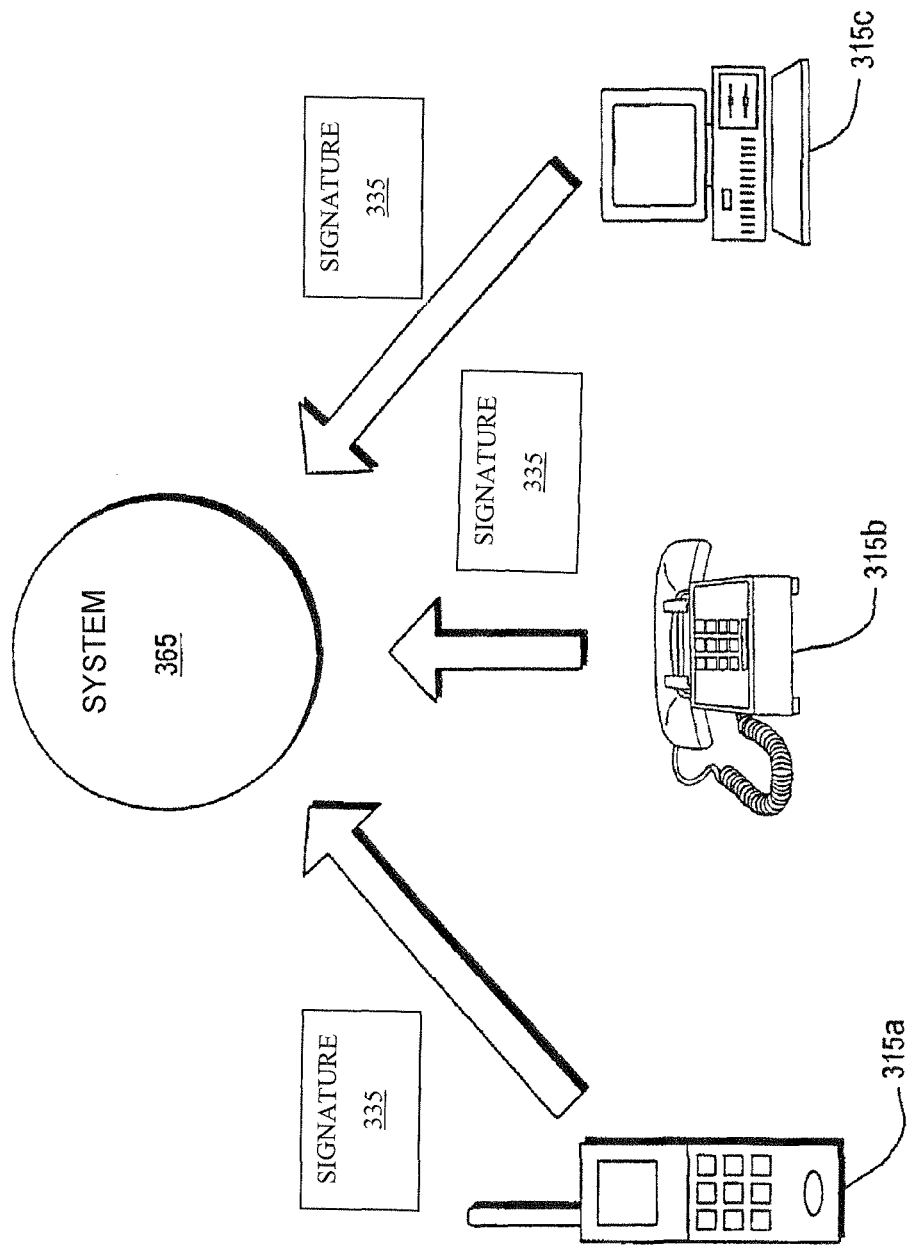

BINARY CODE GENERATED BY 16-BIT SAMPLE STRING
| ✓ | ✓ | ✓ | ✓ | ✗ | ✗ | ✓ | ✓ | ✓ | ✓ | ✓ | ✓ | ✓ | ✓ | ✗ | ✓ |
|---|---|---|---|---|---|---|---|---|---|---|---|---|---|---|---|
| 0 | 0 | 1 | 0 | 1 | 1 | 0 | 0 | 0 | 0 | 1 | 0 | 1 | 0 | 1 | 1 |
| 0 | 0 | 1 | 0 | 1 | 0 | 1 | 0 | 0 | 0 | 1 | 0 | 1 | 0 | 0 | 1 |
— MASTER COPY 410
— PROVIDED COPY 405
13/16 MATCHING = 81%
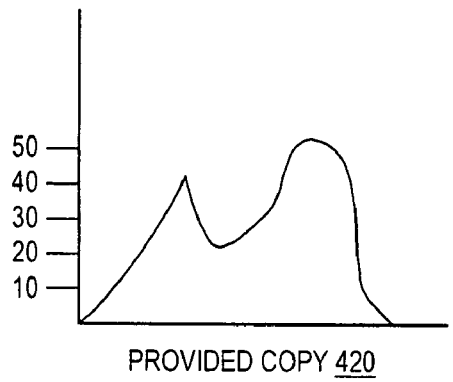
PROVIDED COPY 420
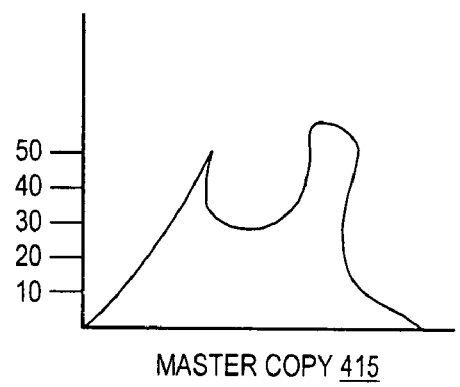
MASTER COPY 415
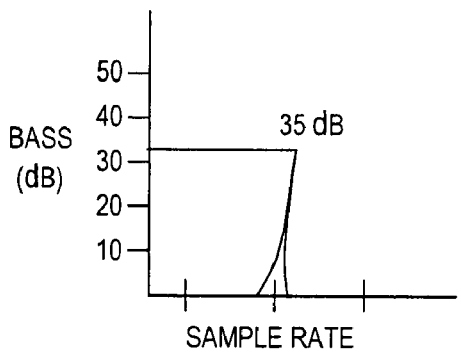
PROVIDED COPY 425
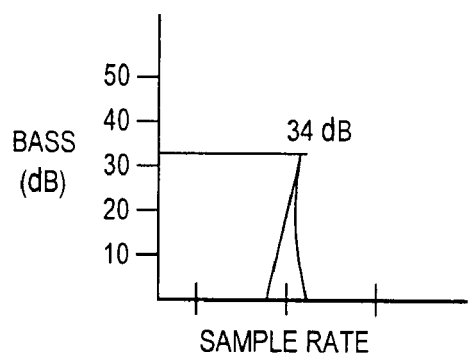
MASTER COPY 430
FIG. 4

SYSTEM AND METHOD FOR RADIO FREQUENCY IDENTIFIER VOICE SIGNATURE

BACKGROUND OF THE INVENTION

It is well known that passwords for secure accounts may be given either verbally or typed into a keypad and registered electronically to give users access, or to block unauthorized users from gaining access to accounts or other secure systems. These passwords include everything from a personal identification number (PIN) entered into a touchpad at an automatic teller machine (ATM), to a credit card number read when a credit card is swiped, to an account number and specific user data that is requested by a bank's customer service phone operator to validate a customer's identity in order to access the user's mortgage information over a telephone call.

Currently, physical signatures on paper or electronic keypads, entering of alphanumeric codes, fingerprint matching, retinal scanning or the answering of personal identification questions are the common methods that are used to validate the authenticity of an individual. The authenticity of an individual is validated to verify the identity of the individual, to conduct secure transactions, or to grant secure access to an area, venue, ticketed event, information or account.

SUMMARY OF THE INVENTION

Some conventional techniques log a user's signature via electronic keypad or log a user's touchpad code. Other conventional techniques match a user's voice for voice activated commands and manual voice data confirmations. Unfortunately, with these techniques there is no security layer which transforms a user's voice signature into a unique radio frequency identifier (RFID) signature which may be deployed as a layer of confirmation or as a security code for use in a variety of security systems or transactions.

Accordingly, one embodiment of the present invention translates a user's first signature, such as a user's voice signature into a user's second signature, such as a RFID signature. The user's second signature is deployed. By translating the user's first signature into the user's second signature and then deploying the user's second signature, the authenticity of the user is assured.

In another embodiment of the present invention, to translate a user's voice signature into a RFID signature, the user's spoken name is recorded as the user's voice signature. A RFID tag is then attached to the recorded user's spoken name to produce the RFID signature. Translating the user's voice signature into the RFID signature may include processing a sound wave representing the user's spoken name to generate a master copy of the user's voice signature. The master copy the user's voice signature may then be used to verify a provided copy of the user's voice signature to authenticate the user. In one embodiment, the user's voice signature is translated into the RFID signature at a user device, such as a cell phone, telephone or computer. Alternatively, the user's voice signature is translated into the RFID signature at a device, such as a retailer's electronic transaction system or a voice signature central server.

In yet another embodiment of the present invention, in deploying the user's second signature the user's information is accessed with the deployed user's second signature and the accessed user's information is verified to authenticate the user.

In still another embodiment of the present invention, in deploying the user's second signature to assure authenticity of the user, a provided copy of the user's first signature is verified against a master copy of the user's first signature to authenticate the user.

By translating a user's first signature, such as a user's voice signature into a user's second signature, such as a RFID signature, a security layer is provided. Such a provided security layer adds security and flexibility. For example, in one embodiment of the present invention, in deploying the user's second signature the user's second signature is de-authorized and re-attached to the user's first signature periodically to assure authenticity of the user. Alternatively, to assure authenticity of the user the user's second signature is de-authorized and re-attached to the user's first signature in an event the user's first signature is compromised.

Other authentication factors besides a user's voice signature and a RFID signature may be used to authenticate a user. By attaching or otherwise assigning additional authentication factors, such as a personal identification number (PIN) to a user's voice signature, the attached authentication factors may be used with the user's voice signature in multiple combinations and sequences to authenticate the user and to assure authenticity of the user.

Accordingly, in one embodiment of the present invention, a user's third signature is attached to a user's first signature and a user's second signature. In an event verifying a master copy of the user's first signature with a provided copy of the user's first signature is not successful, a provided copy of the user's third signature is verified against a master copy of the user's third signature to authenticate the user. In this way, this embodiment authenticates the user by a combination of the user's first signature and the user's third signature with the user's first signature and the user's third signature being verified in sequence.

A user's second signature may be deployed to authenticate a user within one of several contexts, such as a user device, a central server, a retail transaction, and a financial transaction. That is to say, the authenticity of the user may be assured at the user device, at the central server, at a retailer (point of sale), or at a financial institution (e.g., ATM location). Accordingly, in one embodiment of the present invention, the user's second signature is deployed to authenticate the user within a context of a user device, a central server, a retail transaction, and a financial transaction.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3B is a block diagram illustrating a device deploying a RFID signature in accordance with embodiments of the present invention;

FIG. 4 is a series of graphs illustrating verification of a user's voice signature in accordance with embodiments of the present invention;

DETAILED DESCRIPTION OF THE INVENTION

A description of example embodiments of the invention follows.

Figure 1:
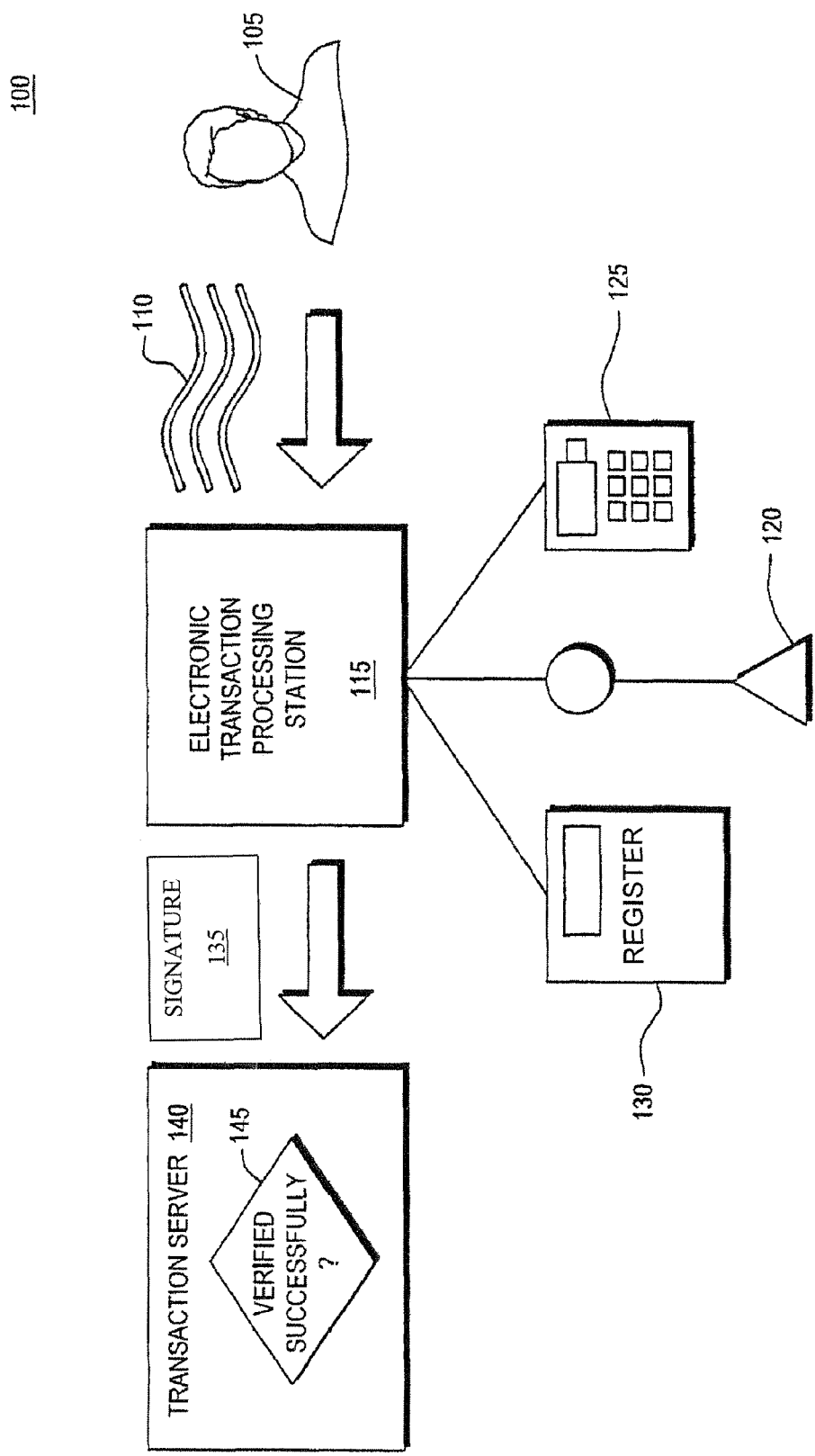
FIG. 1 is block diagram illustrating an overview of the present invention ensuring authenticity of a user in the context of an example retail transaction.

FIG. 1 provides an overview of assuring authenticity of a user in the context of an example retail transaction 100. A user 105 provides a first signature 110 such as the user's spoken name. The user's first signature 110 is provided to a retailer's electronic transaction processing station 115. In this example, the retailers electronic transaction processing station 115 is equipped with a microphone 120 to accept the user's spoken name and a keypad 125 to accept the user's personal identification number (PIN). The retailer's electronic transaction processing station 115 communicates with the retailer's cash register 130.

The user's first signature 110 is "translated" into a second signature 135, such as a RFID signature. The second signature 135 is deployed to the retailer's transaction server 140 to authenticate the user and to complete the retail transaction. For example, the user's password and financial account are verified 145.

In the above example, the second signature 135 is deployed to the retailer's electronic transaction processing station 115 to authenticate the user 105 within the context of the retail transaction 100. That is to say, the authenticity of the user 105 is assured at the retailer. However, one skilled in the art will readily appreciate that deploying a second signature is not limited to authenticating a user within the context of a retail transaction, but may also include, for example, within the context of a user device, a central server and a financial transaction. That is to say, the authenticity of the user may be assured at the user device, the central server, or the financial institution.

For example, the deployed second signature 135 may activate a user session within, for example, the context of a user device or a central server. In another example, the deployed second signature 135 may further validate the user session. In yet another example, the deployed second signature 135 may commence a transaction within, for example, the context of a retail or financial transaction. In still yet another example, the deployed second signature 135 may consummate or otherwise complete the transaction.

Figure 2:
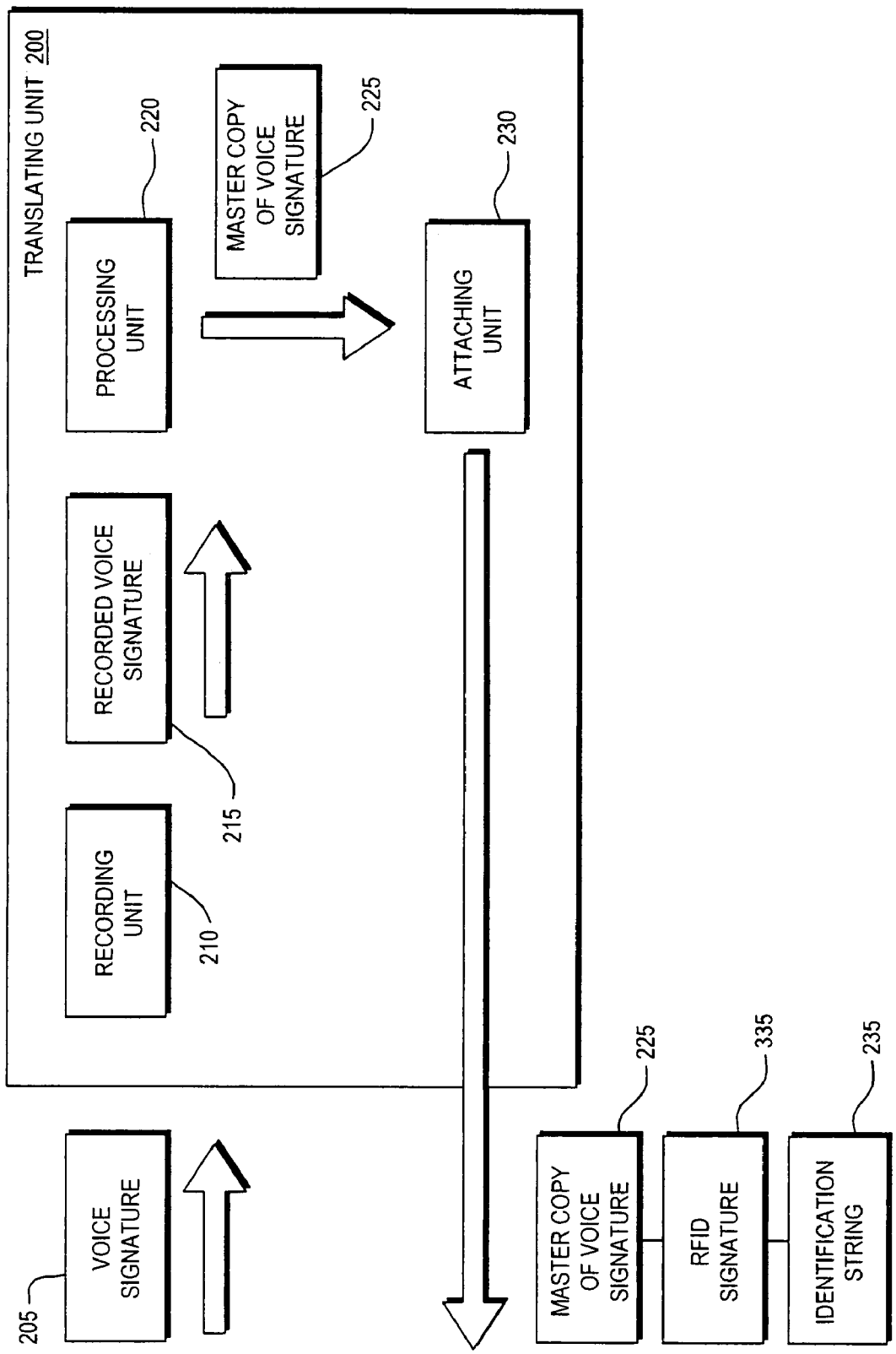
FIG. 2 is a block diagram illustrating "translating" a user's voice signature into a RFID signature in accordance with one embodiment of the present invention.

FIG. 2 illustrates an example translating unit 200 for "translating" a user's voice signature into a RFID signature. The translating unit 200 is made up of a recording unit 210, a processing unit 220, and an attaching unit 230. The translating unit 200 is coupled to an interface (not shown) adapted to accept a user's voice signature 205 sent from a device (not shown), such as a cell phone, a telephone, a computer, an electronic transactions processing station, and a voice signature central.

The user's voice signature 205, such as the user's spoken name is recorded by the recording unit 210 resulting in a recorded voice signature 215. The recorded voice signature 215 is processed by the processing unit 220 into a master copy of the user's voice signature 225. In this way, the master copy of the user's voice signature 225 can be used to verify a provided copy of the user's voice signature (e.g., the next instance when the user speaks the user's name). As such, by verifying a user's voice signature (i.e., voice signature verification) a user can be authenticated and authenticity of the user can be assured.

The recorded voice signature 215 is processed by the processing unit 220 applying, for example, various voice treatments, such as time limiters, bass modulation, treble modulation, frequency modulation, and wave form spectral analysis (not shown). In another example, audio encryption is applied to encrypt the recorded voice signature (not shown). In yet another example, waveform and other dynamic analysis tools are applied to the recorded voice signature to account for variations in a user's voice quality and phrasing (not shown). Since a user's voice quality and phrasing may vary from moment to moment, day to day, etc. such tools may be used to accommodate for these variations. In still yet another example, an algorithm factoring in the dynamic ranges of bass, high and low end frequency, waveform, and time is applied to the recorded voice signature (not shown) at the processing unit 220.

The aforementioned is by no means an exhaustive list of how a user's voice signature can be processed into a master copy of the user's voice signature. How the user's voice signature is processed into the master copy of the user's voice signature, however, is not of consequence. Instead, what is of consequence is that the master copy of the user's voice signature serves as an "audio thumbprint" against which a provided copy of the user's voice signature is verified against to authenticate the user and to assure authenticity of the user.

A master copy of a user's voice signature, however, is but one authentication factor with which to authenticate a user. By attaching or otherwise assigning additional authentication factors to a master copy of a user's voice signature, the master copy of the user's voice signature may be used with those attached authentication factors in multiple combinations and sequences to authenticate the user and to assure authenticity of the user. For example, the following authentication factors are attached to one another: a user's voice signature, a user's RFID signature, and a user's PIN. In all event, for example, the user's RFID signature is not available (e.g., a user device storing the user's RFID signature is stolen) the user may still be authenticated with the user's voice signature, the user's PIN or combinations thereof.

Returning to FIG. 2, the attaching unit 230 renders or otherwise attaches an identification string 235 (e.g., a person identification number (PIN) or other number string) to the master copy of the user's voice signature 225 to further identify the user's voice signature. In this way, if a user's voice signature changes drastically (e.g., due to mood or health), the identification string 235 may be used instead in an event a provided copy of the user's voice signature does not match or is otherwise verified unsuccessfully against the master copy of the user's voice signature 225. In addition to attaching the identification string 235, an attaching unit 230 attaches a unique radio frequency identifier (RFID) signature 335 (described below in greater detail) to the master copy of user's voice signature 225.

In this way, a user's first signature, such as a user's spoken name is "translated" into at least one user's second signature, such as a PIN or a RFID signature. Translating a user's first signature into at least one user's second signature provides an additional layer of security, as well as adds flexibility. For example, in an event a RFID signature is compromised (e.g., a user device storing the RFID signature is stolen), the compromised RFID signature may be de-authorized and another RFID signature may be attached or otherwise assigned to a user's voice signature. In another example, an "old" RFID signature attached to a user's voice signature may be changed or otherwise replaced with a "new" RFID signature regularly.

In one embodiment, a user's voice signature is translated into a RFID signature. The REID signature contains a unique Electronic Product Code (EPC). The EPC is a standard for identifying objects, such as products, proposed by the Auto-ID Center, and supported by the Uniform Code Council (UCC) and the European Article Numbering (EAN) International. For example, an EPC for a product in addition to identifying the product itself may identify the manufacturer of the product and the type of product. Rather than identifying products, this embodiment of the present invention uses an EPC to identify a user. One skilled in the art, however, will readily recognize the present invention is not intended to be limited to an EPC, but contemplates other identifiers and other schemes for identifying a user.

To assure integrity, the REID signature 335 translated from the user's voice signature 205 is changed over time. For example, a user or a system administrator may elect to change the RFID signature 335 periodically or in an event the RFID signature 335 is compromised. To further assure integrity, the audio encryption process used to encrypt the recorded voice signature 215 or the master copy of the user's voice signature 225 may also be changed over time.

Figure 3A:
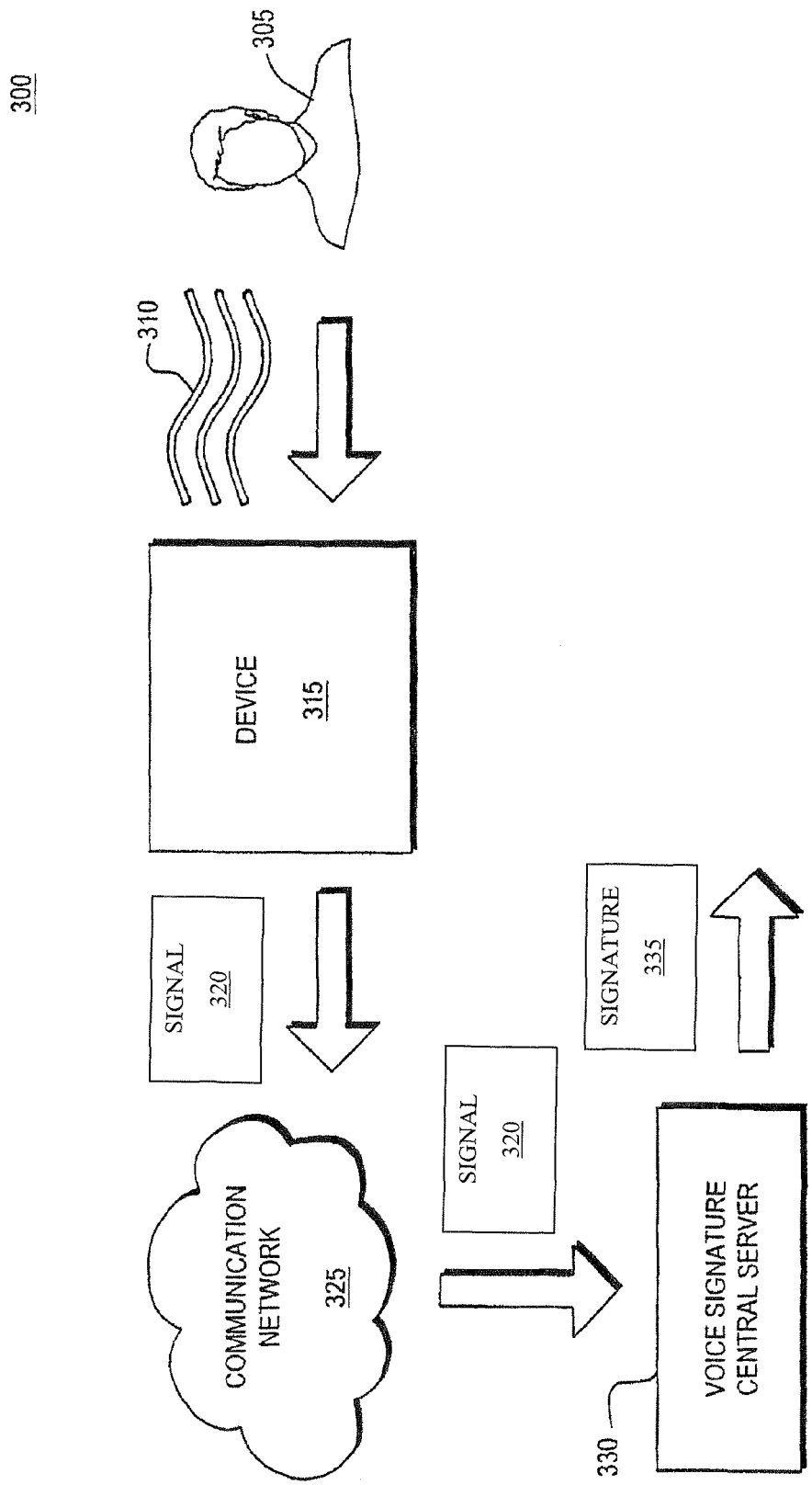
FIG. 3A is a block diagram illustrating an example system for "translating" a user's voice signature into a RFID signature and for deploying the RFID signature in accordance with one embodiment of the present invention.

FIG. 3A illustrates an example system 300 for translating a user's first signature, such as the user's spoken name into an at least one user's second signature, such as a RFID signature according to the present invention. A user 305 speaks the user's name and generates sound waves 310 representing the user's spoken name. The sound waves 310 are transmitted from a device 315, such as a cell phone as a communication signal 320 through a communication network 325, such as a cellular network.

The communication signal 320 by which the user's spoken name is transmitted, is sent to a voice signature central server 330 where the user's spoken name is logged or otherwise identified as belonging to the user. The user's spoken name is modulated or otherwise processed and translated into a RFID signature 335. As such, the user's spoken name is attached to or otherwise corresponds with the RFID signature 335. In addition to translating the user's spoken name into the RFID signature 335, in later instances, the user's spoken name (and thus the user) is authenticated at the voice signature central server 330 by verifying the user's spoken name.

In addition to translating a user's voice signature into a RFID signature, additional authentication factors such as a PIN or a password may be attached to the user's voice signature 205. As such, in addition to (or in lieu of) verifying the user's spoken name to authenticate the user, a chosen password or given user number may also be verified at the voice signature central server 330. In one example, a given user number is based upon the process described in reference to FIGS. 4 and 5.

In an alternative embodiment, the sound waves 310 representing with the user's spoken name are modulated at the device 315. In this embodiment, the user's spoken name (and thus the user) is authenticated at the device 315, in contrast to the embodiment described above.

Continuing with FIG. 3A, once translated the RFID signature 335 attached to user's spoken name may be deployed, for example, to complete a transaction or to verify other forms of identification, such as a driver's license. In this example, the voice signature central server 330 deploys the RFID signature 335. Alternatively, the device 315 deploys the RFID signature 335.

FIG. 3B illustrates the device 315, such as a cell phone 315a, a telephone 315b, and a computer 315c deploying the RFID signature 335. As described in reference to FIG. 3A, a user's spoken name is processed and translated into the RFID signature 335. As such, the user's spoken name is attached to or otherwise corresponds with the RFID signature 335. However, rather than processing and translating the user's spoken voice into the RFID signature 335 at a voice signature central server, such as the voice signature central server 330 of FIG. 3A, the user's spoken name is processed and translated at the device 315 of FIG. 3B.

From the device 315, the RFID signature 335 is deployed to a system 365, such as network operation center (NOC) for a cellular or telephone network operator, or an internet service provider (ISP). Alternatively, the system 365 may be a centralized service specifically established to authenticate users using RFID signatures.

At the system 365, the user's RFID signature 335 along with user information, such as a financial account number (not shown) is logged or otherwise stored on, for example, a database server (not shown). In this way, the RFID signature 335 is deployed from the user device 315 to access information about an account belonging to the user. In one example, the deployed RFID signature 335 references or otherwise indexes a user's account or other information. To access the user's information referenced by the deployed RFID signature 335 the user may be prompted or otherwise required to provide a voice signature, such as the user's spoken name. To illustrate, consider the following example.

At a user device, a user provides a voice signature, such as the user's spoken name. The voice signature is translated at the user device into a RFID signature which is then deployed to access user information. The deployed RFID signature is used to reference a master copy of the user's voice signature to which a provided copy of the user's voice signature is verified against to authenticate the user. Once authenticated and user authenticity is assured, access to the user's information is granted.

FIG. 4 illustrates verifying a user's voice signature. In one embodiment, a user's voice signature is stored in a waveform audio format (WAV). A WAV file is a MICROSOFT and IBM audio file format standard for storing audio on a personal computer. A WAV file is compatible with both APPLE and MICROSOFT WINDOWS systems.

A WAV file is created by sampling a sound wave 44,100 times per second and using 16 bits to encode each sample. Consequently, for a user's voice signature, such as the user's name spoken in 1-3 seconds there is a tremendous amount of binary information with which to verify a provided copy 405 of the user's voice signature against a master copy 410 of the user's voice signature. For example, for a verifiable match between the provided copy 405 of the user's voice signature and the master copy 410 of the user's voice signature, 13 out of 16 bits per sample (i.e. 81%) must match. The top graph in FIG. 4 is illustrative.

Alternatively, a wave pattern representing the provided copy of the user's voice signature in graphical form 415 may be compared against a wave pattern representing the master copy of the user's voice signature in graphical form 420 to verify the user's voice signature. For example, if a comparison between the wave pattern representing the provided copy 415 and the wave pattern representing the master copy 420 exceeds a high point differential of 20%, then the provided copy 415 of the user's voice signature is rejected as a non-match (i.e., the provided copy 415 does not match the master copy 420). The two graphs in the middle of FIG. 4 are illustrative.

Alternatively, for a verifiable match between a provided copy of a user's voice signature 425 and a master copy of the user's voice signature 430, a standard deviation from the time it takes a user to speak, for example, the user's name and the standard decibel of bass in the user's name must fall within a reasonable range, e.g., 80% of the measurements of the provided copy 425 compared to the master copy 430 held, for example, in a database. As voice quality for a user can vary over both large and short time frames, the standard deviation takes these variations in voice qualities into account. If the standard deviation results in a matching of less than 80%, then the provided copy of the user's voice signature 425 is rejected as a non-match (i.e., the provided copy 425 does not match the master copy 430). The two graphs in the bottom of FIG. 4 are illustrative.

The aforementioned techniques for verifying a user's voice signature may be used separately or combined to verify the user's voice signature. For example, the results (i.e., percent match) of each of the techniques may be averaged together. In an event, the average is determined or otherwise calculated to be greater than, for example, 80% match then the user's voice signature is successfully verified, despite any one of the techniques resulting in less than 80% match. In this way, a user's voice signature has a second chance at being verified successfully.

Figure 5:
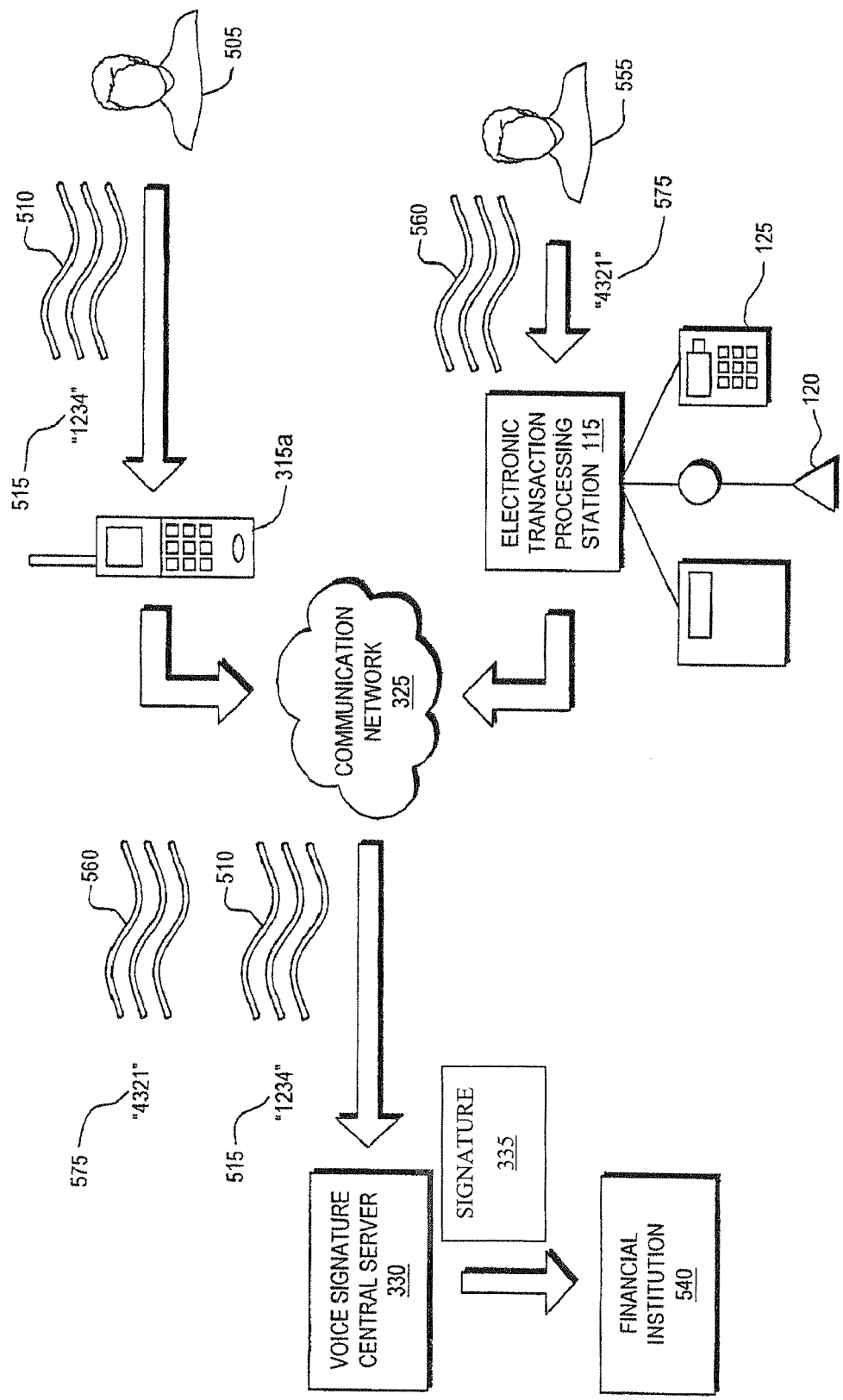
FIG. 5 is a block diagram illustrating authenticating a user in an event the user's voice signature is unsuccessfully verified in accordance with embodiments of the present invention.

FIG. 5 illustrates authenticating a user in an event the user's voice signature is unsuccessfully verified. By attaching or otherwise assigning additional authentication factors, such as a personal identification number (PIN) or a password to a user's voice signature, the attached additional authentication factors may be used with the user's voice signature in multiple combinations and sequences to authenticate the user. For example, if a user's voice signature changes drastically (e.g., due to mood or health) such that verifying the user's voice signature is unsuccessful, a PIN may be used in lieu of the user's voice signature to authenticate the user. To further illustrate, consider the following examples illustrated in FIG. 5.

In the first example, a user 505 states the user's name 510 and PIN 515 by speaking into a cell phone 315*a*. The cell phone 315*a* is connected via a communications network 325 to a voice signature central server 330. At the voice signature central server 330, the user's stated name 510 is recognized (e.g., using voice recognition software) and verified (e.g., by comparing a provided copy of the user's spoken name against a master copy of the user's spoken name stored in a database). It should be noted, even if the user's stated name 510 is recognized, the user's stated name 510 may not be verified successfully. As such, the authenticity of the user's identity is ambiguous. To resolve such ambiguity, the user's stated PIN 515 is also recognized by the voice signature central server 330.

If the user's stated name 510 (i.e., user's voice signature) is verified successfully, there is no ambiguity in the user's identity and the voice signature central server 330 deploys a RFID signature 335 attached to the user's voice signature to a financial institution 540, for example. With the deployed RFID signature 335, the financial institution 540 verifies the user's financial information, such as available funds or available line of credit. In this way, the user is authenticated at the financial institution 540.

If however, the user's stated name 510 (i.e., user's voice signature) is not verified successfully, there is ambiguity in the user's identity. To resolve the ambiguity, the user's stated PIN 515, as recognized by the voice signature central server 330, is verified against a master copy of the user's PIN attached to the user's voice signature. If the user's stated PIN 515 is verified successfully by the voice signature central server 330, the ambiguity in the user's identity is resolved. Subsequently, the RFID signature 335 attached to the user's voice signature is deployed from the voice signature central server 330 to the financial institution 540 to verify the user's financial information. In this way, an additional authentication factor attached to a user's voice signature is used to verify the identity of the user in an event the user's voice signature cannot be verified successfully.

In the second example, a user 555 states the user's name 560 by speaking into an electronic payment processor 115 having a microphone 120. Additionally, the user 555 keys in or otherwise enters a user's PIN 575 into electronic payment processor 115 via an alphanumerical keypad 125. The electronic payment processor 115 is connected via the communications network 325 to the voice signature central server 330 where the user's stated name 560 is recognized (e.g., using voice recognition software) and verified (e.g., by comparing a provided copy of the user's spoken name against a master copy of the user's spoken name stored in a database). It should be noted, even if the user's stated name 560 is recognized, the user's stated name 560 may not be verified successfully. As such, authenticity of the user's identify is ambiguous. To resolve such ambiguity, the user's entered (keyed in) PIN 575 is used by the voice signature central server 330.

If the user's stated name 560 (i.e., voice signature) is verified successfully, there is no ambiguity in the user's identity and the voice signature central server 330 deploys the RFID signature 335 attached to the user's voice signature to the financial institution 540. With deployed RFID signature 335, the financial institution 540 verifies the user's financial information, such as available funds or available line of credit.

If however, the user's stated name 560 (i.e., voice signature) is not verified successfully, there is ambiguity in the user's identity. To resolve the ambiguity, the user's entered (keyed in) PIN 575 is verified against a master copy of the user's PIN attached to the user's voice signature. If the user's entered PIN 575 is verified successfully by the voice signature central server 330, the ambiguity in the user's identity is resolved. Subsequently, the RFID signature 335 attached to the user's voice signature is deployed from the voice signature central server 330 to the financial institution 540 to verify the user's financial information. In this way, an additional authentication factor attached to a user's voice signature is used to verify the identity of the user in an event the user's voice signature cannot be verified successfully.

In the previous two examples, the voice signature central server 330 resolves ambiguity in a user's identity by verifying an additional authentication factor attached to the user's voice signature, such as a user's PIN (515 and 575) in an event the user's voice signature (510 and 560) cannot be verified successfully. As such, the user is authenticated at the voice signature central server 330.

Alternatively, the additional authentication factor attached to the user's voice signature may also be deployed to the financial institution 540. In such an instance, the financial institution 540, in addition to verifying the user's financial information, also verifies the additional authentication factor, such as the user's PIN (515 and 575). In this way, the user is authenticated at the financial institution 540.

Figure 6:
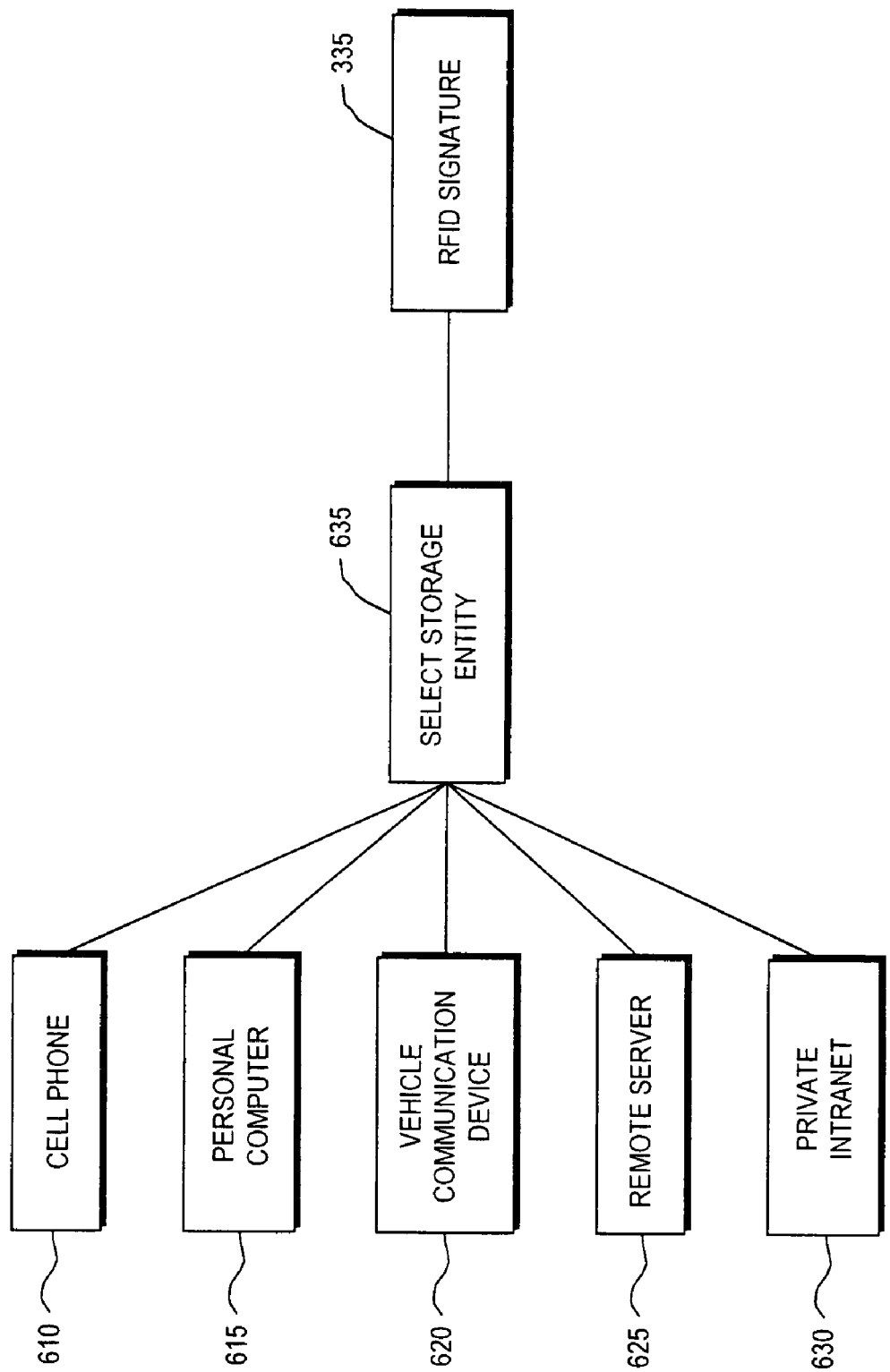
FIG. 6 is a block diagram illustrating storing a RFID signature in various external storage entities and deploying the stored RFID signature from the various external storage entities in accordance with embodiments of the present invention.

FIG. 6 illustrates storing a RFID signature 335 in a variety of storage entities, such as a cell phone 610, personal computer 615, or other local device. The RFID signature 335 may be stored in a vehicle communication device 620, such as a personal computer mounted within a vehicle. The RFID signature 335 may be stored on a remote server 625 that is in communication with a variety of clients, such as a financial institution. The remote server 625 is responsive to client queries, such as financial and informational data queries. The RFID signature 335 may be stored in a private intranet 630, such as a virtual private network (VPN) of a financial institution. Storing the RFID signature 335 in a private intranet 630 enables an institution, such as a financial institution to act as a single isolated source to verify the user's RFID signature 335 to assure the authenticity of a user.

In addition to storing, the RFID signature 335 may be a deployed from the storage entity (e.g., phone 610, personal computer 615, vehicle communication device 620, remote server 625, and private intranet 630) by selecting 635 the storage entity through, for example, a selection menu of a controller (not shown). Alternatively, the RFID signature 335 may be deployed from the storage entity (phone 610, personal computer 615, vehicle communication device 620, remote server 625, and private intranet 630) by voice activation.

Figure 7A:
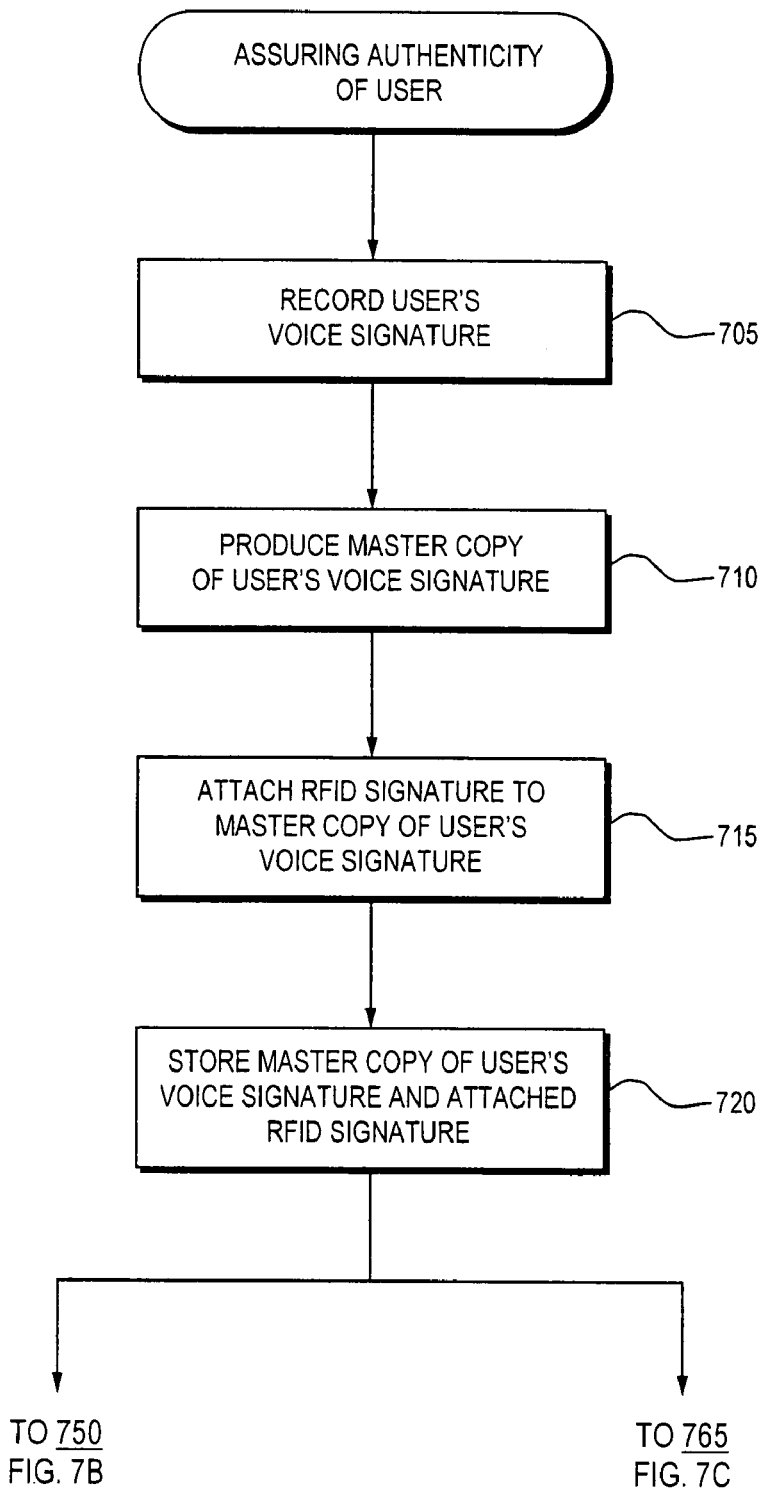
FIGS. 7A-7C are flow diagrams illustrating an example process for ensuring authenticity of a user in accordance with one embodiment of the present invention.
Figure 7B:
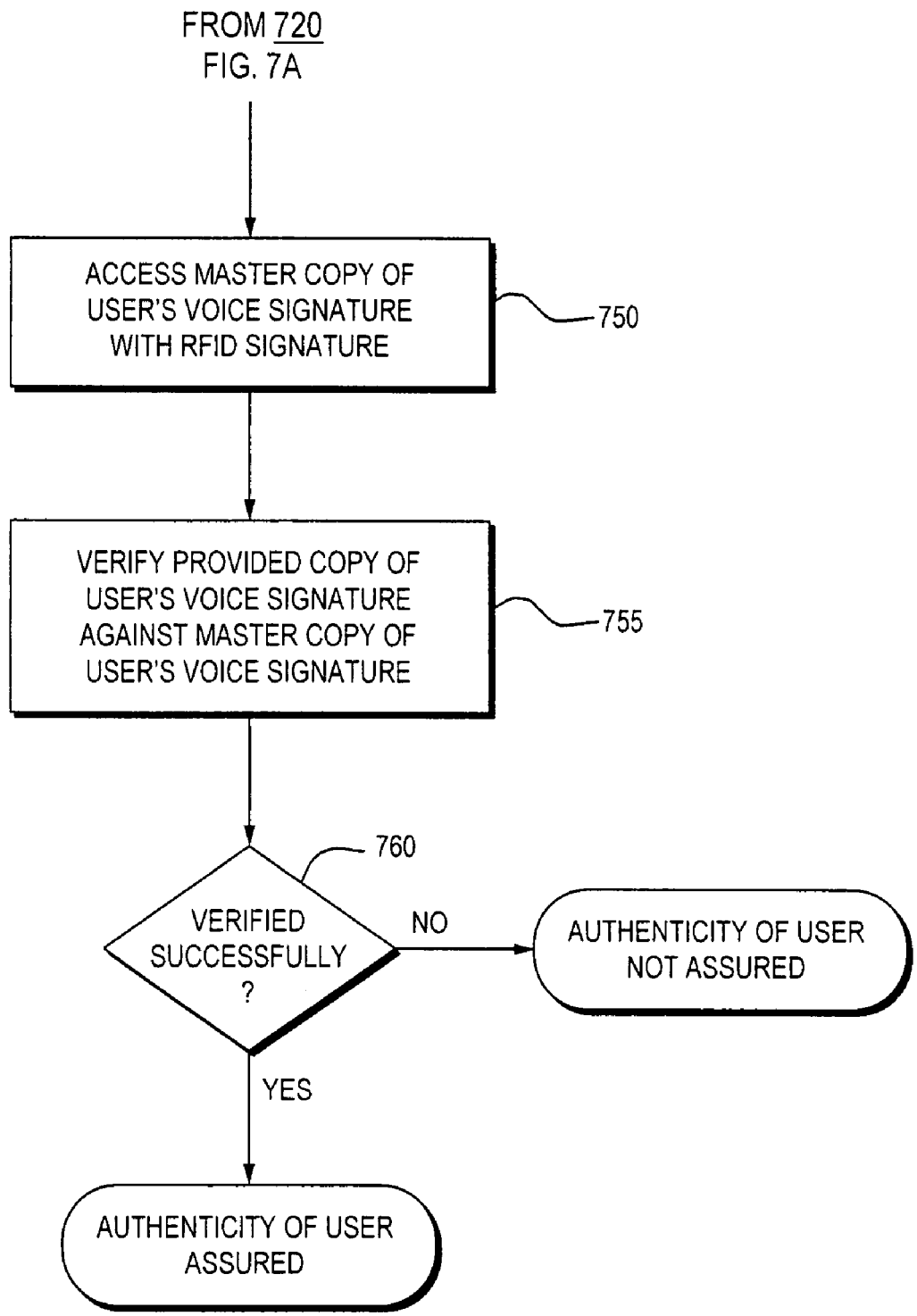
Figure 7C:
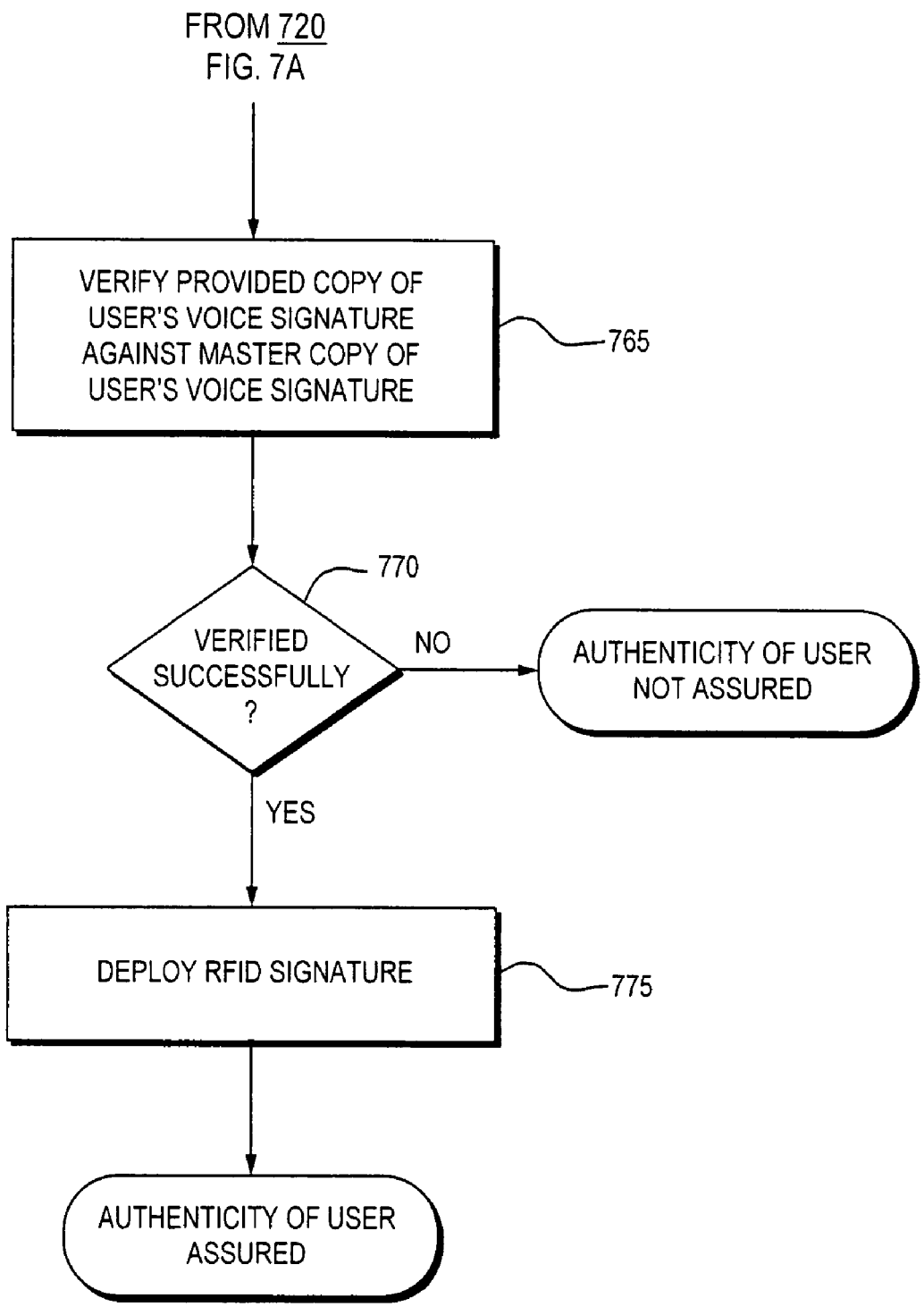

FIGS. 7A-C illustrate an example process 700 for ensuring authenticity of a user. The process 700 records (step 705) a user's voice signature, such the user's spoken name. The process 700 produces (step 710) a master copy of the user's voice signature. The produced master recording of the user's voice signature is used to verify subsequent recordings or instances of the user's voice signature to authenticate the user.

In one embodiment, the process 700 modulates (not shown) and analyzes (not shown) sound elements of the user's recorded voice signature to produce the master copy of the user's voice signature. The process 700 attaches (step 715) or otherwise assigns a unique RFID signature to the master copy of the user's voice signature. In this way, the process 700 "translates" the user's voice signature into the RFID signature.

The process 700 optionally attaches (not shown) an additional authentication factor, such as a personal identification number (PIN) to the master copy of the user's voice signature. In this way, in an event the user's voice signature cannot be verified successfully, the process 700 verifies (not shown) the additional authentication factor to authenticate the user as described above in FIG. 5.

The process 700 stores (step 720) the produced master copy of the user's voice signature and the attached RFID signature (and the optionally attached additional authentication factor) in, for example, a database. In this way, the produced master copy of the user's voice signature and the attached RFID signature (and the optionally attached additional authentication factor) may be verified either separately or in combination to authenticate the user.

For example, in FIG. 7B, the process 700 accesses (step 750) the master copy of the user's voice signature with the stored RFID signature. The process 700 verifies (step 755) a provided copy of the user's voice signature against the accessed master copy of the user's voice signature. The process 700 determines (step 760) whether the provided copy of the user's voice signature is verified successfully against the master copy of the user's voice signature. If the process 700 determines (step 760) the provided copy of the user's voice signature is verified successfully against the master copy of the user's voice signature, the user is authenticated and authenticity of the user is assured.

If however, the process 700 determines (step 760) the provided copy of the user's voice signature is not verified successfully against the master copy of the user's voice signature, the user is not authenticated and authenticity of the user is not assured. In one embodiment (not shown), in an event, the process 700 determines (step 760) the provided copy of the user's voice signature is not verified successfully against the master copy of the user's voice signature, the process verifies a provided copy of an additional authentication factor, such as a PIN against a master copy of the additional authentication factor attached to the user's voice signature. In this way, a user may be authenticated and authenticity of the user assured, even when the user's voice signature cannot be verified successfully.

In another example illustrated by FIG. 7C, the process 700 verifies (step 765) a provided copy of the user's voice signature against the master copy of the user voice signature. The process 700 determines (step 770) whether the provided copy of the user's voice signature is verified successfully against the master copy of the user's voice signature. If the process 700 determines (step 770) the provided copy of the user's voice signature is verified successfully against the master copy of the user's voice signature, the process 700 deploys (step 775) the RFID signature attached to the master copy of the user's voice signature. The deployed RFID signature may be used, for example, to complete a transaction or to access the user's financial account. In this way, the user is authenticated and the authenticity of the user is assured.

If however, the process 700 determines (step 770) the provided copy of the user's voice signature is not verified successfully against the master copy of the user's voice signature, the user is not authenticated and the authenticity of the user is not assured. In one embodiment (not shown), in an event the process 700 determines (step 770) the provided copy of the user's voice signature is not verified successfully against the master copy of the user's voice signature, the process verifies a provided copy of an additional authentication factor, such as a PIN against a master copy of the additional authentication factor attached to the user's voice signature. In this way, a user may be authenticated and authenticity of the user assured, even when the user's voice signature cannot be verified successfully.

Figure 8:
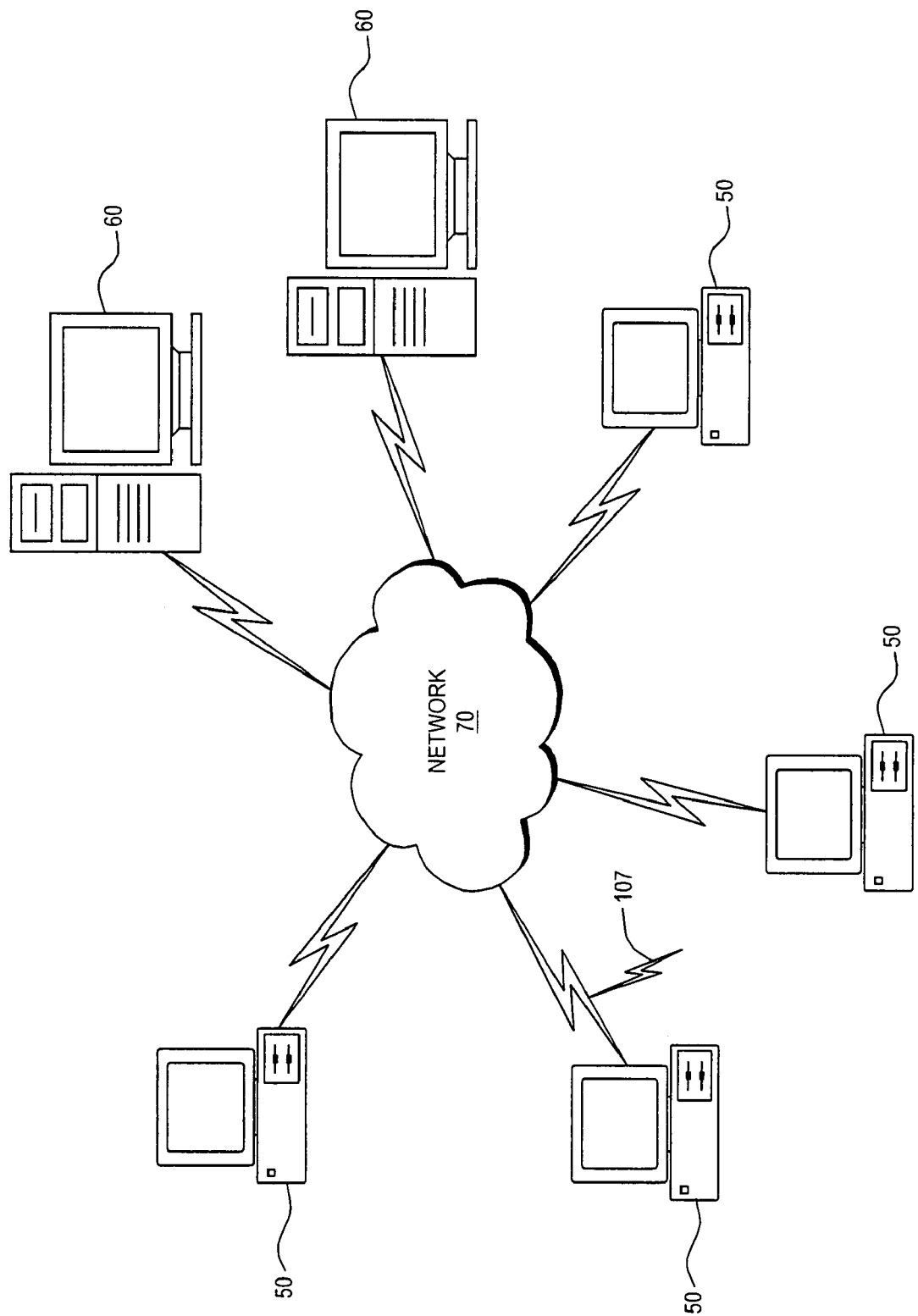
FIG. 8 is an example network deploying embodiments of the present invention.

FIG. 8 illustrates a computer network or similar digital processing environment in which embodiments of the present invention may be deployed.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 9:
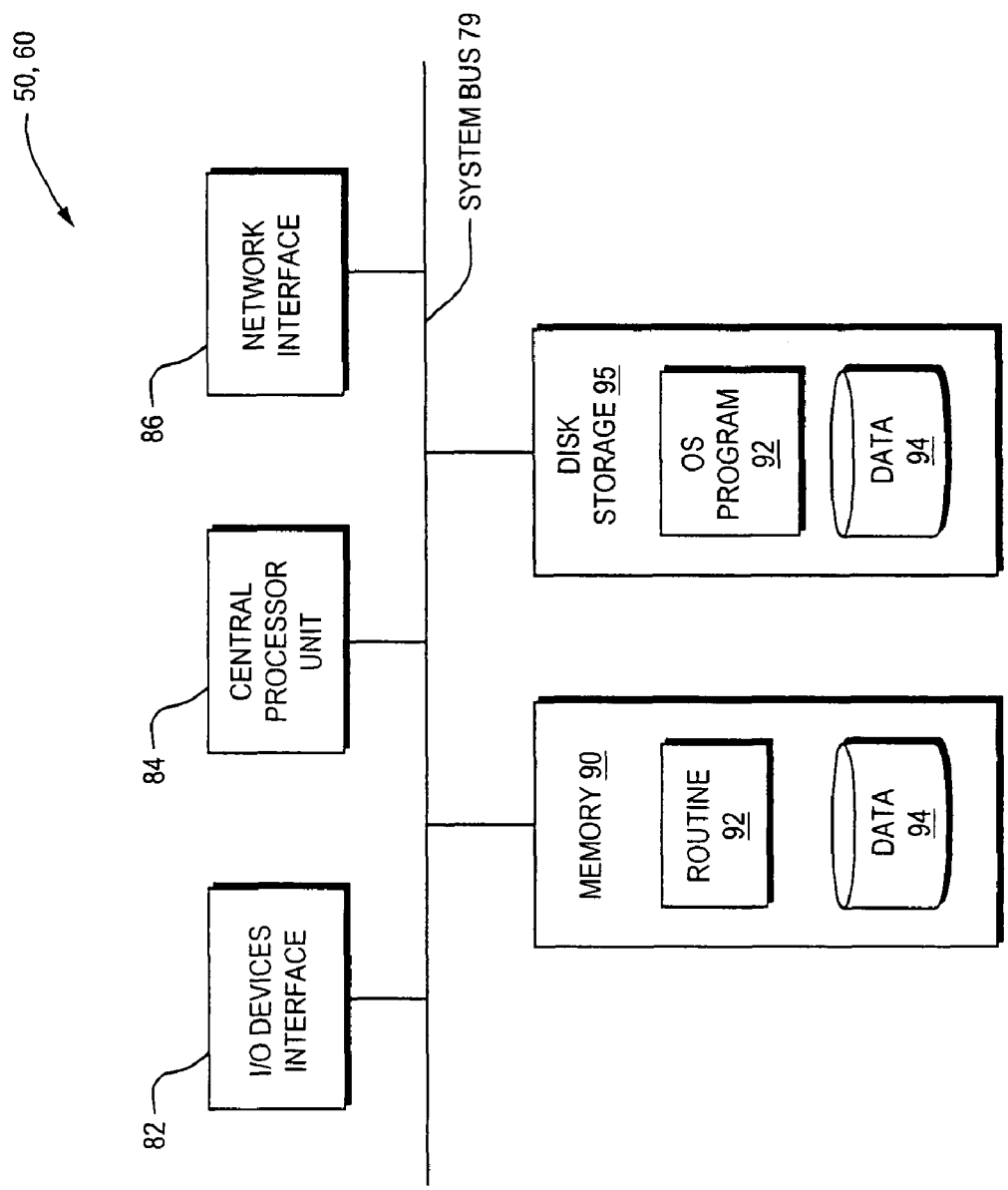
FIG. 9 is an example computer implementing embodiments of the present invention.

FIG. 9 is a block diagram of the internal structure of a computer (e.g., client processor/device 50 or server computers 60 of FIG. 8) in which various embodiments of the present invention may be implemented. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 8). Memory 90 provides volatile storage for computer software instructions 92 and data 94 used to implement an embodiment of the present invention (e.g. the translating unit 200, and the translation, storage and deployment of the RFID signature 335 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented in a variety of computer architectures. The computer of FIGS. 8 and 9 are for purposes of illustration and not limitation of the present invention.

While this invention has been particularly shown and described with references to preferred embodiments thereof, it will be understood by those skilled in the art that various changes in form and details may be made therein without departing from the scope of the invention encompassed by the appended claims.

It should be understood that elements of the block diagrams, network diagrams, and flow diagrams described above may be implemented in software, hardware, or firmware. In addition, the elements of the block diagrams and flow diagrams described above may be combined or divided in any manner in software, hardware, or firmware. If implemented in software, the software may be written in any language that can support the embodiments disclosed herein. The software may be stored on any form of computer-readable medium, such as RAM, ROM, CD-ROM, and so forth. In operation, a general purpose or application specific processor loads and executes the software in a manner well understood in the art.

What is claimed:

1. A computer implemented method, comprising:
    recording, by a portable communication device, a user's voice as a user's first signature;
    receiving, by the portable communication device, a personal identification number (PIN) of a user;
    identifying, by the portable communication device, a master copy of the user's voice associated with the PIN;
    verifying, by the portable communication device, the user's first signature against the master copy;
    determining, by the portable communication device, a computer-generated radio frequency identification (RFID) code associated with the master copy in response to verifying the user's first signature;
    creating, by the portable communication device, a user's second signature comprising the RFID code and the user's first signature, wherein the RFID code and the user's first signature are each separately used to authenticate the user in a sequence comprising the user's first signature followed by the RFID code, or the RFID code followed by the user's first signature; and
    wirelessly transmitting, by the portable communication device, the user's second signature in an authentication transaction.

2. The computer implemented method of claim 1, wherein the RFID code comprises an Electronic Product Code (EPC).

3. The computer implemented method of claim 1, wherein recording the user's voice comprises processing a sound wave representing the user's spoken name to generate the master copy.

4. The computer implemented method of claim 1, wherein the user's second signature further comprises the PIN.

5. The computer implemented method of claim 1, further comprising:
    receiving, by the portable communication device, user information associated with the user in response to transmitting the user's second signature, wherein the user information is received from a remote central processor.

6. The computer implemented method of claim 1, further comprising:
    creating, by the portable communication device, a user's third signature comprising the PIN and the RFID code; and
    transmitting, by the portable communication device, the user's third signature to authenticate the user in an event verifying the user's first signature is not successful.

7. The computer implemented method of claim 1, further comprising:
    de-authorizing, by the portable communication device, the user's second signature;

automatically generating, by the portable communication device, a new RFID code associated with the master copy; and creating, by the portable communication device, a new user's signature comprising the user's first signature and the new RFID code.

8. The computer implemented method of claim 7, wherein the new RFID code is automatically generated in a periodic manner.

9. The computer implemented method of claim 7, wherein the new RFD code is generated when the user's second signature is compromised.

10. The computer implemented method of claim 1, wherein the user's second signature is transmitted from a remote user device to a central server.

11. The computer implemented method of claim 10, wherein the user's second signature is transmitted as part of a retail transaction or a financial transaction.

12. The computer implemented method of claim 1, wherein verifying the user's first signature against the master copy comprises:

comparing, by the portable communication device, a number of sampled bits from the user's first signature against corresponding sampled bits of the master copy to determine a first result;

comparing, by the portable communication device, a wave pattern representing the user's first signature against the master copy to determine a second result; and taking an average of the first and second results to determine a verifiable match of the user's first signature with the master copy.

13. The computer implemented method of claim 1, wherein the RFID code comprises a computer translation of the user's voice.

14. A portable communication device comprising:

a recording device configured to record a user's original voice as a user's voice signature;

an input device configured to receive a personal identification number (PIN);

a database configured to store a master copy of the user's original voice, wherein the master copy is associated with the PIN; and a processing device configured to:

compare the user's voice signature against the master copy to verify the user's voice signature;

identify a computer-generated radio frequency identification (RFID) code that is associated with a user in the database in response to the user's voice signature being verified, wherein the RFID code is periodically changed;

create a user's second signature comprising the computer-generated identification code and the user's voice signature, wherein the RFID code and the user's voice signature are each separately used to authenticate the user in a sequence comprising the user's voice signature followed by the RFID code, or the RFID code followed by the user's voice signature; and wirelessly transmit the user's second signature.

15. The portable communication device of claim 14, wherein the user's original voice is recorded via a phone call from a cell phone or a telephone.

16. The portable communication device of claim 14, wherein the processing device is further configured to:

generate a radio frequency identifier (RFID) signature derived from a sound wave representing the user's original voice, wherein the master copy comprises the RFID signature.

17. A portable communication device comprising:

means for recording a user's voice as a user's first signature;

means for identifying a master copy of the user's voice associated with the user's first signature;

means for comparing the user's first signature against the master copy to identify the user's first signature;

means for determining a computer-generated radio frequency identification (RFID) code associated with the master copy, wherein the RFID code is periodically changed;

means for creating a user's second signature comprising the RFID code and the user's first signature, wherein the user's second signature is created in response to the user's first signature being identified, and wherein each of the RFID code and the user's first signature are used to individually authenticate the user in a sequence comprising the user's first signature followed by the RFID code, or the RFID code followed by the user's first signature; and means for wirelessly transmitting the user's second signature.

18. The portable communication device of claim 17, further comprising means for inputting a personal identification number (PIN) of a user, wherein the user's first signature is authenticated when the PIN matches account information associated with the user's first signature.

19. The portable communication device of claim 17, further comprising:

means for removing the RFID code from the user's second signature:

means for determining a new computer-generated RFID code associated with the master copy; and means for creating a new user's second signature comprising the user's first signature and the new RFID code.

20. The portable communication device of claim 19, wherein both the RFID code and the new RFID code identify a single user.

21. The portable communication device of claim 14, wherein the portable communication device houses the recording device, and wherein the portable communication device is configured to wirelessly deploy the RFID code during a retail transaction or a financial transaction.

22. A non-transitory computer-readable medium having stored thereon computer-executable instructions that, in response to execution by a portable communication device, cause the portable communication device to perform operations comprising:

recording a user's voice as a user's first signature;

comparing the user's first signature against a master copy of the user's voice to authenticate the user's first signature;

identifying a computer-generated Electronic Product Code (EPC) associated with the master copy;

creating a user's second signature comprising the EPC and the user's first signature in response to the user's first signature being authenticated, wherein each of the EPC and the user's first signature are used to individually authenticate the user in a sequence comprising the first signature followed by the EPC, or the EPC followed by the user's first signature; and transmitting the user's second signature in an authentication transaction.

23. The computer-readable medium of claim 22, wherein the operations further comprise:

receiving a personal identification number (PIN) of a user; and identifying the master copy of the user's voice associated with the PIN, wherein the user's second signature further comprises the PIN.

24. The portable communication device of claim 21, wherein the portable communication device is configured to wirelessly deploy the computer-generated identification code in response to a voice command.

25. The computer-readable medium, of claim 22, wherein the EPC is periodically changed, and wherein the portable communication device comprises a cell phone.

* * * * *

UNITED STATES PATENT AND TRADEMARK OFFICE
CERTIFICATE OF CORRECTION

Page 1 of 1

PATENT NO. : 8,384,516 B2
APPLICATION NO. : 11/622630
DATED : February 26, 2013
INVENTOR(S) : Fein et al.

It is certified that error appears in the above-identified patent and that said Letters Patent is hereby corrected as shown below:

In the Drawings

In Fig. 4, Sheet 5 of 12, delete "PROVIDED COPY 420" and insert -- PROVIDED COPY 415 --, therefor.

In Fig. 4, Sheet 5 of 12, delete "MASTER COPY 415" and insert -- MASTER COPY 420 --, therefor.

In the Specification

In Column 2, Line 58, delete "is block" and insert -- is a block --, therefor.

In Column 3, Line 29, delete "110 such" and insert -- 110, such --, therefor.

In Column 3, Line 32, delete "retailers" and insert -- retailer's --, therefor.

In Column 4, Line 52, delete "all event," and insert -- an event, --, therefor.

In Column 5, Line 18, delete "REID" and insert -- RFID --, therefor.

In Column 5, Line 31, delete "REID" and insert -- RFID --, therefor.

In Column 7, Line 33, delete "match then" and insert -- match, then --, therefor.

In the Claims

In Column 13, Line 11, in Claim 9, delete "RFD" and insert -- RFID --, therefor.

In Column 14, Line 31, in Claim 19, delete "signature:" and insert -- signature; --, therefor.

In Column 16, Line 1, in Claim 25, delete "medium," and insert -- medium --, therefor.

Signed and Sealed this
First Day of July, 2014

Michelle K. Lee
*Deputy Director of the United States Patent and Trademark Office*